United States Patent
Craen et al.

(10) Patent No.: US 12,405,406 B2
(45) Date of Patent: Sep. 2, 2025

(54) CONTROLLABLE LENS ACTUATED VIA FLEXURE JOINTS

(71) Applicant: POLIGHT ASA, Skoppum (NO)

(72) Inventors: Pierre Craen, Embourg (BE); Janne Tapani Kilpinen, Akaa (FI); Vladimir Kartashov, Horten (NO)

(73) Assignee: poLight ASA, Skoppum (NO)

(*) Notice: Subject to any disclaimer, the term of this patent is extended or adjusted under 35 U.S.C. 154(b) by 447 days.

(21) Appl. No.: 18/000,629

(22) PCT Filed: Jun. 22, 2021

(86) PCT No.: PCT/EP2021/066948
§ 371 (c)(1),
(2) Date: Dec. 2, 2022

(87) PCT Pub. No.: WO2021/259911
PCT Pub. Date: Dec. 30, 2021

(65) Prior Publication Data
US 2023/0296814 A1    Sep. 21, 2023

(30) Foreign Application Priority Data
Jun. 22, 2020  (EP) ..................... 20181359

(51) Int. Cl.
*G02B 3/14*   (2006.01)
*G02B 26/08*  (2006.01)

(52) U.S. Cl.
CPC ............ *G02B 3/14* (2013.01); *G02B 26/0833* (2013.01)

(58) Field of Classification Search
None
See application file for complete search history.

(56) References Cited

U.S. PATENT DOCUMENTS

2020/0096770 A1   3/2020   Pedder et al.

FOREIGN PATENT DOCUMENTS

| EP | 2 869 097 A1 | 5/2015 |
| WO | WO 2013/143630 A1 | 10/2013 |

(Continued)

OTHER PUBLICATIONS

International Search Report mailed Aug. 30, 2021 in International Application No. PCT/EP2021/066948.

(Continued)

*Primary Examiner* — Richard H Kim
(74) *Attorney, Agent, or Firm* — Knobbe Martens Olson & Bear LLP

(57) ABSTRACT

The invention relates to a controllable lens with variable optical power. The lens comprises a first and second cover members (111, 112), a transparent, deformable, non-fluid body (105) sandwiched between the first and second i transparent cover members, so that the first and second transparent cover members and non-fluid body constitute a lens, one or more actuators arranged to provide displacement in a direction along the optical axis, and one or more elastic elements (130, 130_1, 130_2) connecting the actuator displacement elements with the first cover member, wherein at least a portion of each of the one or more elastic elements is arranged to deform elastically in response to a relative radial displacement between the first transparent cover member and the actuator displacement elements. A first stiffness in a radial direction of each of the one or more elastic elements is smaller than a second stiffness in the direction of the optical axis of each of the one or more elastic elements.

15 Claims, 7 Drawing Sheets

(56) References Cited

FOREIGN PATENT DOCUMENTS

| WO | WO 2019/002524 A1 | 1/2019 |
| WO | WO 2020/074711 A1 | 4/2020 |

OTHER PUBLICATIONS

International Preliminary Report on Patentability mailed Oct. 4, 2022 in International Application No. PCT/EP2021/066948.

CONTROLLABLE LENS ACTUATED VIA FLEXURE JOINTS

CROSS REFERENCE TO RELATED APPLICATIONS

This application is a U.S. National Phase Application of PCT International Application Number PCT/EP2021/066948, filed on Jun. 22, 2021, designating the United States and published in the English language, which is an International Application of and claims the benefit of priority to European Patent Application No. 20181359.9, filed on Jun. 22, 2020. The disclosures of the above-referenced applications are hereby expressly incorporated by reference in their entireties.

FIELD OF THE INVENTION

The invention relates to lenses with variable focal length, such as variable lenses for use in compact cameras.

BACKGROUND OF THE INVENTION

Use of variable focal length lenses in cameras and other electronic devices are of great interest as such lenses may replace multi-lens systems configured with motors for displacing lenses to achieve variable focal length. Variable focal length lenses may be used for improving the performance of the electronic device and/or for size reduction. There is still a need for improving the performance and quality of the variable lenses such as reducing the wave front error performance of the lens.

SUMMARY

It is an object of the invention to improve variable focal length lenses. Particularly, it is an object of the invention to provide a suitable actuator mechanism, including a way to transfer actuator motion to lens membranes which does not cause deformation of the membranes which could cause generation of aberrations and wave front errors.

In a first aspect of the invention there is provided a controllable lens with variable optical power, the lens comprises
  a first cover member and a second cover member, wherein one of the first and second cover members is transparent, and the other of the first and second cover members is transparent or reflective,
  a transparent, deformable, non-fluid body sandwiched between the first and second cover members, so that the first and second transparent cover members and non-fluid body constitute a lens with an optical axis intersecting the first and second cover members and the non-fluid body,
  one or more actuators comprising a plurality of actuator displacement elements arranged to be displaced in a direction parallel or substantially parallel with the optical axis,
  one or more elastic elements connecting the actuator displacement elements with the first cover member, wherein at least a portion, such as an elastic portion, of each of the one or more elastic elements is arranged to deform elastically in response to a relative radial displacement between the first cover member and the actuator displacement elements, wherein each of the one or more elastic elements has a first stiffness in the radial direction and a second stiffness in the direction of the optical axis, wherein the first stiffness is smaller than the second stiffness.

The stiffness of the elastic elements may be an elastic stiffness such as the elastic coefficient of a spring or a viscoelastic stiffness. The stiffness may be given by the combination of dimensions of the elastic element and elastic material properties such as Young's modulus of the material. The first and second stiffness gives the relation between the deformation in the radial direction and the axial direction (along the optical axis) and the radial force or torque causing the radial deformation and the axial force causing the axial deformation.

Advantageously, by connecting the actuator output with the cover member, i.e. the lens membrane, by an elastic connection element, which can be designed to deform elastically in at least the radial direction in response to a bending of the cover member, the change of the radial extension of the cover member caused by the actuator is accumulated by the elastic elements. By the relative radial displacement is understood that at least a component of the relative radial displacement has a direction perpendicular to the optical axis in the radial direction.

The elastic elements comprise a structure having a bendable shape designed to bend in the radial direction, i.e. towards the optical axis, while the structure is less bendable or not bendable, or only allows minor compression or tension, in the axial direction along the optical axis, where the design provides that the first or radial stiffness is smaller than the second or axial stiffness.

The elastic deformation may comprise deformations in a radial direction towards the optical axis, deformations in a rotational direction due to a torque. Radial deformation may comprises deformations in the range from 0.05 µm to 500 µm, such as in the range from 0.1 µm to 250 µm, in the range from 0.1 µm to 50 µm, in the range from 0.5 µm to 50 µm, in the range from 1 µm to 25 µm, in the range from 2 µm to 500 µm, in the range from 5 µm to 500 µm, in the range from 5 µm to 250 µm, such as in the range from 7 µm to 150 µm.

The first cover member is a first transparent cover member and the second cover member is either a second transparent cover member or a second reflective cover member. Alternatively, the first cover member is either a first transparent cover member or a first reflective cover member, and the second cover member is a second transparent cover member.

According to an embodiment, each of the elastic elements are arranged to deform elastically in response a torque acting around an axis being tangent to a path circumscribing the optical axis, wherein the torques are generated by the relative radial displacements between the first cover member and the actuator displacement elements.

Advantageously, the elastic elements are able to support a rotational component, with low elastic resistance, resulting from the bending of the first cover member.

According to an embodiment, each elastic element has a first portion fixed to the first cover member and a second portion fixed to the actuator displacement element, or fixed to at least one of the actuator displacement elements, wherein the first and second portions are elastically connected, such as by the portion of the elastic elements arranged to deform elastically in response to the relative radial displacement.

Advantageously, the fixed connections provide a rigid connection allowing efficient transfer of the actuator motion to the first cover member.

The first and second portions may be elastically connected via the related elastic portion of the one or more elastic elements is arranged to deform elastically. The first and second portions may form more rigid portions of the elastic element, e.g. portions which does not deform, or deforms less, in response to the relative radial displacement between the first transparent cover member and the actuator displacement elements. Thus, the first and second portions may distinguish from the elastic portion of the elastic element in terms of the elasticity, such as a lower elasticity (high stiffness) against relative radial displacement between the first transparent cover member and the actuator displacement elements.

According to an embodiment, the first portion of the elastic elements are connected to the first cover member at separated locations distributed along a path circumscribing the optical axis.

For example, the one or more actuators may be arranged to generate forces along a path encircling the optical axis of the first cover member so as to generate a controllable change of curvature of the first and/or second cover member.

According to an embodiment, each elastic element has a first spring constant in the radial direction and a second spring constant in the direction of the optical axis, wherein the first spring constant is smaller than the second spring constant.

According to an embodiment, the controllable lens comprises one or more other elastic elements connecting the actuator displacement elements with the second cover member.

Thus, the controllable lens may comprise a first elastic element and a second elastic element located so that they faces the first and second cover members, respectively.

According to an embodiment each elastic element comprises an an elastic adhesive. Alternatively or additionally, the elastic element comprises a non-metal material or a viscoelastic material, of which elastic adhesive is an example.

Advantageously, a glue or adhesive may be used as the elastic component or in combination with other types of elastic components such as elastic hinges, flexure structures and other spring elements.

According to an embodiment, each elastic element comprises one or more spring elements, wherein each spring element comprises the first portion.

According to an embodiment, each elastic element comprises a support member, wherein the support member comprises the second portion. The support member may be arranged as a common support for a plurality of the displacement elements and/or for a plurality of the elastic portions of each of the one or more elastic elements.

Thus, the support member such as a force distributing support member may connect with a plurality of displacement elements and/or with a plurality of the the elastic portions, such as spring elements. According to an embodiment each of the spring elements are structured as individual spring elements. Accordingly, each spring element is able to deform independently from other spring elements.

According to an embodiment, the support member is located radially closer to the optical axis than the spring elements.

According to an embodiment, the controllable lens comprises a first elastic element connecting the actuator displacement elements with the first cover member, and/or a second elastic element connecting other actuator displacement elements with the second cover member.

According to an embodiment, each elastic element comprises one or more spring elements, and an elastic material, such as an elastic adhesive, connected to the first and/or second portion.

Advantageously, the combination of spring elements with other elastic material may improve the capability of the elastic element to provide a low stiffness in response to deformations in the radial direction and in response to rotations such as rotations about an axis tangent to the circumference of the lens, while at the same time provide a high stiffness in the direction of displacement of the actuator displacement element, e.g. along the optical axis.

A second aspect of the invention relates to an electronic device comprising a controllable lens according to the first aspect. For example, the electronic device may be a camera module or other device as listed in the description.

The electronic device comprises a control system for powering and controlling the one or more actuators in order to generate a controllable change of the optical power of the lens. The control system may be configured to shift between predetermined optical powers of the lens. The control system may comprise an electronic circuit and/or a digital processor arranged for generating the control or power signal, optionally for obtaining measured data for determining the control or power signal, and for controlling the actuators using a feedforward or feedback control algorithm based on the measured data and reference values such as desired optical powers of the lens.

A third aspect of the invention relates to use of the controllable lens according to the first aspect for imaging, projecting light, light beam scanning, light detection and other purposes.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1A:
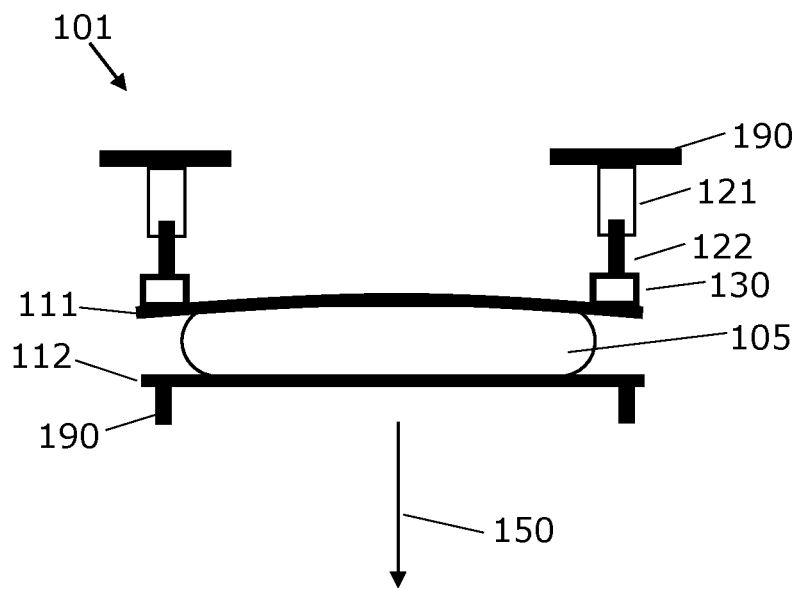
FIGS. 1A-1B show a controllable variable focus length lens.
Figure 1B:
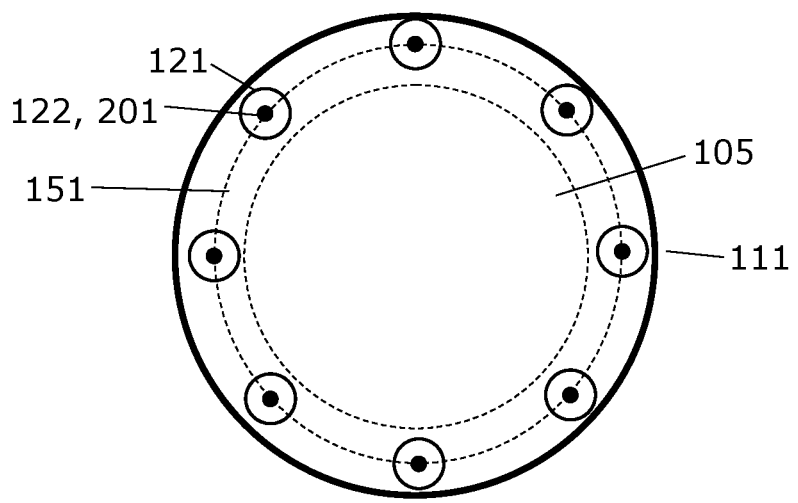

FIG. 1A and FIG. 1B show a side view and a top view of a controllable variable focus length lens 100.

The lens 100 comprises a first cover member 111, and a second cover member 112. At least one of the first and second cover members are configured to be bent by forces provided by actuators. In an example, both of the first and second cover members 111, 112 are transparent cover members, e.g. made from glass or plastic.

Instead of two transparent cover members 111, 112, any of the first and second cover member may be reflective, e.g. provided with a reflective metal layer, to provide full or partial reflection, so that in the incident light beams are reflected back to the opposite transparent cover member. For convenience, examples and embodiments herein refer to transparent cover members 111, 112.

The lens 100 comprises a transparent, deformable, non-fluid body 105 sandwiched between the first and second transparent cover members 111, 112. The non-fluid body 205 abuts the inwardly facing surfaces of the first and second cover members 111, 112.

The first and second transparent cover members 111, 112 and non-fluid body 105 constitute a lens with an optical axis 150 intersecting the first and second transparent cover member and non-fluid body. The optical axis may be defined as the axis which passes through centers of the first and second transparent cover members 111, 112 and the non-fluid body 105 and which is normal to a plane of one of the cover members, the optical axis may be defined according to conventional optical definitions.

The transparent deformable, non-fluid lens body 105 is preferably made from an elastic material. Since the lens body is non-fluid, no fluid-tight enclosure is needed to encapsulate the lens body to prevent a leakage therefrom. In a preferred embodiment, the lens body is made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3. The non-fluid body 205 may have a refractive index which is equal, substantially equal or close to the refractive index of the first and second cover members 111, 112 in order to reduce reflections at the boundaries of the non-fluid body 105.

The transparent cover members 111, 112 may be made from a large number of different materials, such as acrylics, polyolefins, polyesters, silicones, polyurethanes, glass and others. At least the one of the first and second cover members 111, 112 which is arranged to be deformed by the actuators, has a stiffness which is suitable to enable bending by actuation of the actuators 121. In general, the material of the first and/or the second cover member 111, 112 may be formed in a material having a Young's modulus in the range between 5 MPa and 100 GPa to provide the necessary stiffness. For example, Young's modulus for borosilicate glass is 63 GPa, and 72 GPa for fused silica glass.

The bending of the first and/or second cover members 111, 112 is at least partly due to radially varying reaction forces from the lens body 105 which affects the Sag of the cover members 111, 112 and thus the optical power instead of just vertically compressing the lens body with no change in Sag. A full explanation of the effect of the lens body 105 on the curvature of the cover members is described in WO2019002524A1 hereby incorporated by reference.

The lens 100 further comprises one or more actuators 121 comprising a plurality of actuator displacement elements 122 arranged to displace in a direction parallel or substantially parallel with the optical axis 150.

The one or more actuators 121 are arranged to generate forces on the first or the second cover member 111, 112 along a path 151 encircling the optical axis 150, such as a circle on the surface of the first or the second cover member 111, 112. The one or more actuators may be arranged so that the displacement elements act on the outwardly facing surfaces as illustrated, or on the inwardly facing surfaces of one or both of the first and second cover members 111, 112.

For example, the actuators 121 may be linear displacement actuators, such as linear piezoelectric or electromagnetic motors, piezoelectrically actuated cantilever actuators, shape memory alloys, linear screw drives, or linear voice-coil actuators, arranged to apply a displacement at several points, here eight points are illustrated, along the path 151.

In an example, the elastic element 130 is configured as a ring or toroid of glue circumscribing the optical axis, e.g. arranged along the path 151. A force distributing ring, such as a metal ring or a ring made from other sufficiently stiff material so that the ring does not bend or substantially does not bend in the axial direction, is arranged on top of the circular glue ring. The force distributing ring may be embodied by the support member 302 (see description of the support member elsewhere). Two or more displacement elements (actuated by one or more actuators) are arranged to displace the force distribution ring in the axial direction so as to cause a bending of the first or second cover member. In this example, the ring-shaped elastic element 130, being formed from elastic glue, may have a thickness in the axial direction in the range from 0.05 mm to 0.2 mm such as 0.1 mm and a width of the toroid body (difference between inner and outer radius, i.e. the ring thickness) in the range from 0.1 mm to 0.5 mm such as 0.2 mm. The stiffness of the glue in terms of Young's modulus, when cured or hardened, may be in the range from 2 to 200 MPa, such as 25 MPa.

Figure 2A:
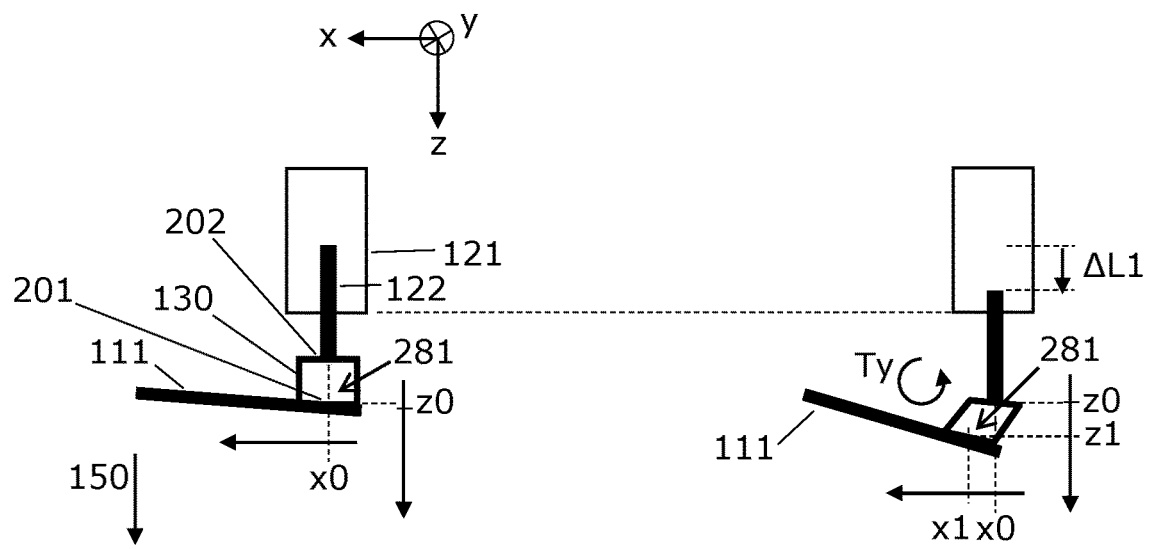
FIG. 2A shows the deformation capability of one of the elastic elements of the variable lens.
Figure 2B:
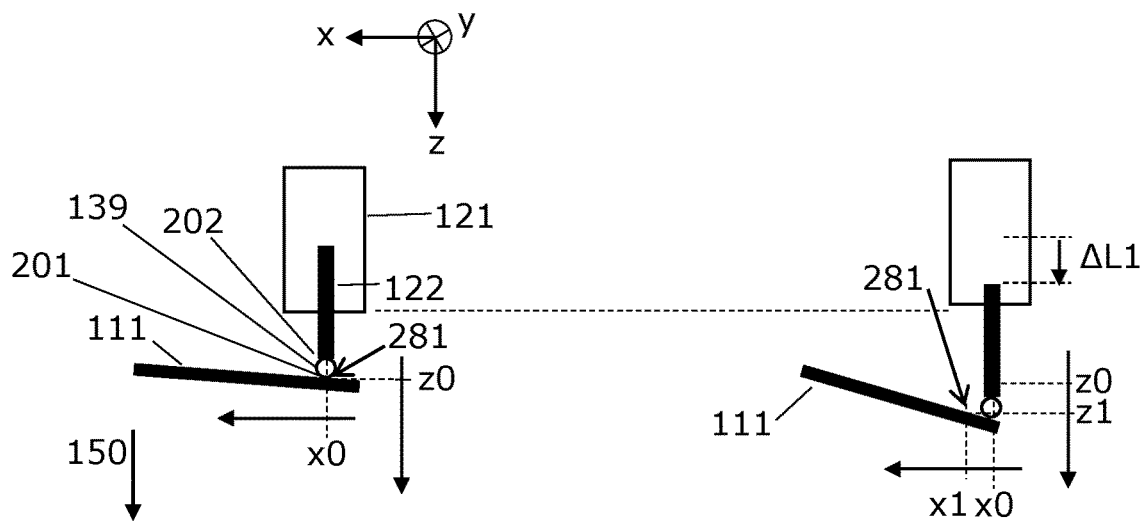
FIG. 2B shows an alternative solution for contact between the actuators and the first cover member based on a sliding contact.

In an example, the actuators are fixed to a stationary support 190 so that the displacement elements 122 displaces relative to the support 190. Similarly, the unactuated cover member, such as the second cover member 112 as illustrated in FIGS. 2A-2B may be supported by a stationary support 190, unless the second cover member 112 is actuated by other actuator displacement elements 122 of other actuators 121.

In an example where the one or more actuators are arranged to act on the inwardly facing surfaces of the first and second cover member 111, 112, the actuators 121 may be connected to one of the cover members via the elastic elements while the displacement elements 122 are connected to the opposite cover member via the elastic elements. In this way the displacement of the actuators will cause bending of both of the cover members. Alternatively, the actuators 121, i.e. the parts which are configured to be stationary, are fixed to a stationary support 190 while the displacement elements 122 are connected to the inwardly facing surfaces of one of the first and second cover members 111, 112. The other cover member, not connected to the displacement elements, may be connected to the stationary support 190.

The actuators may be arranged between the first and second cover members 111, 112, i.e. merely sandwiched between the first and second cover members 111, 112.

The path 151 may encircle the transparent, deformable, non-fluid body 205 so that the non-fluid body 205 is surrounded by the path 151 as illustrated. However, the path 151 also be located within the extension of the non-fluid body 205. The actuators 121 could also be located so that they act on the edge of the first or second cover member 111, 112, or located proximate to the edge.

The actuators 121 are arranged to generate the displacement along the path 151 in a direction normal or substantially normal to the surface of the cover member 111, 112. Substantially normal, in this context, may imply deviations relative to the normal by up to e.g. 10-15 degrees. Angular variations of the angle between the direction of linear displacement and the surface of the cover member are generated dependent on the bending of the cover member.

The action of the actuators, as described in more detail below, changes the curvature of the first and/or the second cover member dependent on the force, torque or displacement provided by the actuators. Thus, by controlling the actuators, the bending and thereby the optical power of the lens 100 can be controlled. If the actuators are arranged in connection with the first cover member, the second cover member may also bend, or vice versa dependent on the thickness or stiffness of the cover member. It is also possible that the actuators are arranged in connection with the first cover member 111, but the first cover member 111 has a high stiffness, so that mainly the second cover member 112 is bent due to the actuator's displacement acting on the first cover member 111. In this case the second cover member 112 may be supported by a stationary support 190.

It is noted that the actuators 121 could be arranged to act on either the first or the second cover member 111, 112. It is also possible that the actuators 121 are arranged to act on both the first and second cover member 121, 122 so that both cover members are forced to bend by the action of the actuators 121, possibly so that actuators on either side are controllable independently, i.e. so that the displacement/force applied on one of the cover members is independent of the displacement/force applied on the other.

The actuator displacement elements 122 of the actuators 121 are connected to the first transparent cover member 111 via elastic elements 130.

The elastic elements 130 deforms elastically in response a relative displacement between the first transparent cover member 111 and the actuator displacement elements 122.

According to an embodiment, the elastic element 130 comprises an elastic material, such as an elastic adhesive. Accordingly, the elastic connection between each of the actuator displacement elements 122 and the cover member 121, 122 may be achieved by performing a gluing process e.g. by applying a specific volume of the adhesive and by ensuring that a specific distance and orientation between actuator displacement element 122 and the cover member 111, 112 is maintained during the curing of the adhesive.

For example, a single elastic element 130 made from elastic glue connecting a single actuator displacement element 122 with one of the cover members 121, 122, may be formed as a cylindrical, e.g. barrel-shaped, element and have a thickness in the axial direction (along the optical axis) in the range from 0.01 mm to 1 mm and a width or radius perpendicular to the axial direction (i.e. in the radial direction) in the range from 0.02 mm to 2 mm. The stiffness of the glue in terms of Young's modulus, may be in the range from 2 to 200 MPa, such as 25 MPa.

In general the elastic glue connection may have a thickness in the range from 0.01-5.00 mm, a width in the radial direction from 0.02-2.00 mm and made from glue with Young's modulus in the range 1-1000 MPa.

FIG. 2A shows the deformation capability of one of the elastic elements 130. The stationary xyz coordinate system is defined relative to an initial location of the elastic elements 130, e.g. when the elastic element 130 is in a non-deformed state. In this example, the z axis is parallel with the optical axis 150.

In the illustration to the left, the first cover member 111 has an initial curvature, which may be due a pre-shaped curvature or due an initial displacement of the actuator displacement element 122. A contact point 281 on the first cover member 111, at the interface between the elastic element 130 and the first cover member 111 has xz coordinates x0,z0.

In the illustration to the right, the actuator 121 has been controlled to move or extend the actuator displacement element 122 by a distance $\Delta L1$ along the z axis. The displacement generates a bending or additional bending of the first cover member 111 so that the contact point 281 moves from x0,z0 to x1,z1 due a radial displacement of the contact point 281 towards the optical axis, i.e. a displacement along the x-axis of the local xyz coordinate system, and due to a displacement along the z axis.

Due to the bending of the first transparent member 111, the surface at the interface between the elastic element 130 and the first cover member 111 is rotated about the y axis, i.e. in general around an axis which is tangent to the path 151 circumscribing the optical axis 150.

As illustrated, the elastic element 130 is configured to deform elastically in the radial direction, here along the x-axis, in response to the relative radial displacement between the first transparent cover member 111 member and the actuator displacement element 122.

Furthermore, the elastic element 130 is configured to deform elastically in response to the torque Ty acting around the y-axis, or the tangent axis. The torque Ty is generated due to the bending of the first transparent member 111 which includes a rotation around the y-axis, or in general due to the relative displacement between the first transparent cover member and the actuator displacement element.

Preferably, the elastic element 130 has a low stiffness in response to deformations in the radial direction and in response to rotations such as rotations about the tangent axis, here the y axis. A low stiffness is preferred in order to allow the first transparent member 111 to bend without being exposed to surface stresses which could affect the curvature of the first transparent member inappropriately, so that the modified curvature leads to increased wave front errors. The undesired stresses would be due to e.g. forces and torques from the elastic element 130 acting in the radial direction and around the tangent axis or y axis.

On the other hand, it is preferred that the elastic element has a high stiffness in the direction of displacement of the actuator displacement element 122, i.e. along the z-axis or along the optical axis 150, in order to transfer the actuator displacement to the cover member.

Thus, according to an embodiment, the elastic element has a first spring constant $k1$ in the radial direction and a second spring constant $k2$ in the direction of the optical axis 150 where the first spring constant $k1$ is greater than the second spring constant $k2$.

The table below gives examples of the size of deformation in relation to the generated optical power and diameter of the first or second transparent cover member 111,112. Said diameter may be specified as the distance between diametrically opposed actuator displacement elements 122. The bending height specifies the distance from the top point of the curved cover member 111,112 to the non-deformed cover member.

| Optical power (dpt) | Cover member diameter (mm) | Bending height (mm) | Radial deformation (µm) |
|---|---|---|---|
| 10 | 10 | 0.125 | 1.55 |
| 100 | 2 | 0.05 | 1.25 |
| 100 | 10 | 1.25 | 158.75 |

Accordingly, the table values gives examples of radial and rotational deformations of the elastic element 130.

The elastic element 130 can be defined as a structure which has a first portion 201 (e.g. the surface contacting the cover member 111 in FIG. 2A) fixed to the first or second transparent cover member and a second portion 202 (e.g. the surface contacting the actuator displacement element 122 in FIG. 2A) fixed to the actuator displacement element. The first and second portions 201, 202 are connected elastically so that they are able to displace elastically relative to each other, e.g. in the radial direction to towards the optical axis. The elastic element 130 may be monolithically manufactured from an elastic material such as silicon, polymer, metal, plastic and other materials.

As shown in FIG. 1B and other examples herein, the first portion 201 of the elastic elements 130 are connected to the first transparent cover member at separated locations distributed along a path circumscribing the optical axis.

In general, the one or more elastic elements 130 should be configured to allow radial deformations at a given location, i.e. the location of an actuator displacement element 122, independent or substantially independent of deformations of other elastic elements 130 at other locations. Accordingly, at least a portion of the one or more elastic elements 130 such as the first portions 201 should be arranged to displace independently or substantially independent of first portions 201 at other locations. Clearly, this is achieved when an individual elastic element 130 is used for each actuator displacement element 122 as in FIG. 1A. However, this objective is also achieved when the elastic element 130 is configured with a plurality of deformable portions such as a plurality of the first portions 201 which are not individually and independently connected to a corresponding plurality of actuator displacement elements 122.

FIG. 2B shows an alternative solution for avoiding generation stresses in the first or second cover member 111, 112. According to this alternative solution, controllable lens 100 is configured with a sliding contact 239 instead of the elastic element 130.

The sliding contact 239 may be embodied by a low friction contact between the actuator displacement element 122 and the first or second cover member 111, 112. The low friction contract may be realized by pairs of low friction materials, e.g. the material of the contacting part of the actuator displacement element 122 which provides low friction or sufficiently low friction relative to the surface of the first or second cover member 111, 112. Examples comprise polyethylene and other plastic materials. Accordingly, the sliding contact 239 need not be constituted by a separate element, but may consist of the direct contact between the actuator displacement element 122 and the first or second cover member 111, 112. Alternatively, the sliding contact may be embodied by a low friction material attached to the end of the actuator displacement element 122.

The sliding contact 304 is configured to enable the sliding contact 239 to slide over the surface of the first and second cover member 111, 112 as the cover member bends due to the displacement ΔL1 of the actuator displacement element 122 along the z-axis. In this example, the displacement generates a bending or additional bending of the first cover member 111 so that the contact point 281 moves from x0,z0 to x1,z1 due a radial displacement of the contact point 281 towards the optical axis, i.e. a displacement along the x-axis of the local xyz coordinate system, and due to a displacement along the z axis. During the bending, the sliding contact 239 slips over the surface of the cover member as illustrated in FIG. 2B.

Figure 3A:
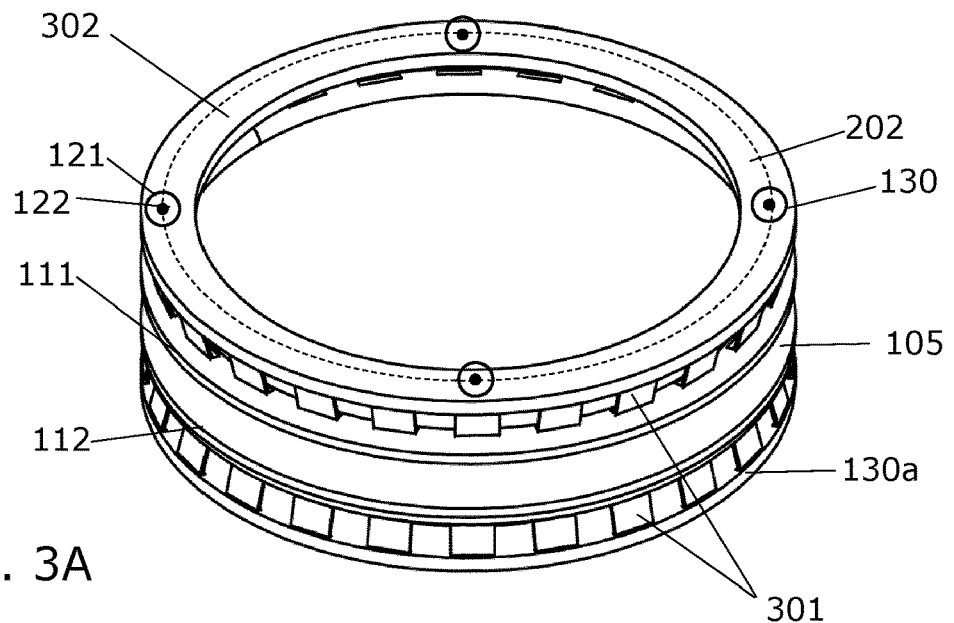
FIGS. 3A-3C shows a first example of an elastic element.
Figure 3B:
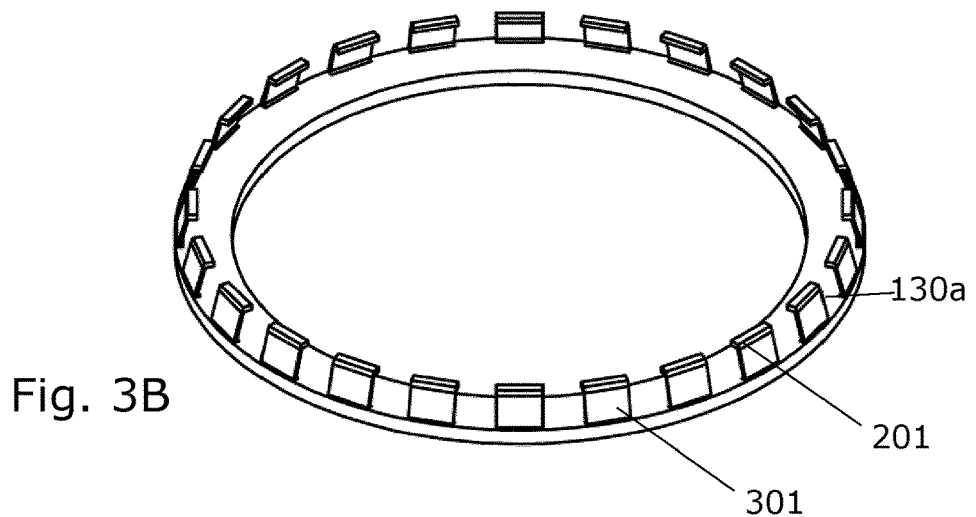
Figure 3C:
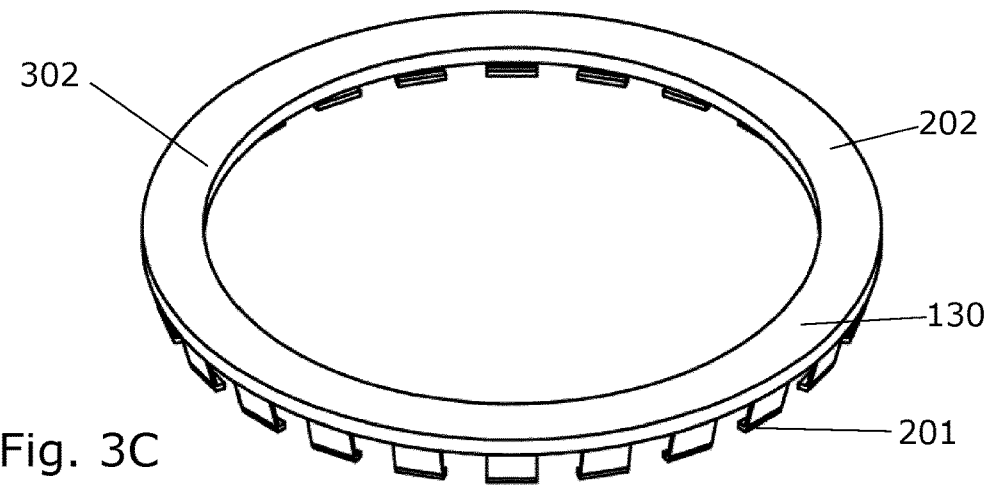

FIGS. 3A-3C shows an example of an elastic element 130 configured with a plurality of deformable portions in the form of a plurality of spring elements 301.

The spring elements 301 comprise the first portion 201. For example, the first portion 201 may be embodied by the end-surface of the cantilevered structures which embodies the spring elements. In response to the bending of the first or second cover member 111, 112, the cantilevered structures bend. The bending of the cantilevered structures comprises a combination of tilting of the cantilever towards the optical axis and rotation of the cantilever. Thus, the bending of the cantilever spring 301 facilitates requirements of the elastic element 130 to provide a low stiffness in response to deformations in the radial direction and a low stiffness in response to rotations such as rotations about the tangent axis or the y-axis.

Each of the spring elements 301 are separated from neighbor spring elements to enable each of the spring elements 301 to deform independent or substantially independent from neighbor spring elements 301. Thus, the spring elements are structured as individual spring elements.

The elastic element comprises a support member 302. As principally illustrated, the actuator displacement elements 122 are arranged to act on the surface of the support member 302. Accordingly, the support member 302 comprises the second portion 202 and is configured as a common support for a plurality of the displacement elements 122, i.e. the plurality of the displacement elements 122 are arranged to act jointly on the support member 302, i.e. so that the displacements of the displacement elements 122 are jointly transferred to the support member.

Alternatively or additionally, the support member 302 comprising the second portion 202 is configured as a common support for a plurality of the spring elements 301 or in general a plurality of elastic portions (such as elastic adhesive portions) of an elastic element 130, are arranged to act jointly on the support member 302, i.e. the plurality of spring elements 301 or elastic portions are jointly connected to the support member 302, i.e. so that reaction forces of the spring elements 301 or elastic portions are jointly transferred to the support member.

In this example, the second portion 202 constitute a more rigid portion of the elastic element 130, i.e. a portion such as an end-portion which at least has a higher elastic coefficient than the radial elastic coefficient k1 of the elastic portion of the elastic element 130. Similarly, the first portion 201 could also constitute a more rigid portion of the elastic element 130.

In this example, the support member 302 is formed as a ring-shaped structure with a hole constituting an aperture for the lens 100.

The elastic element 130 in FIGS. 3A-3C may be monolithically formed. In another example, the spring elements 301 are made from a different material than the support member.

In this example, the first and second cover members 111, 112 are each actuated independently via the upper first elastic element 130 and the lower second elastic element 130a.

FIGS. 4A-4D shows another example of an elastic element 130 configured with a plurality of spring elements 301.

Figure 4A:
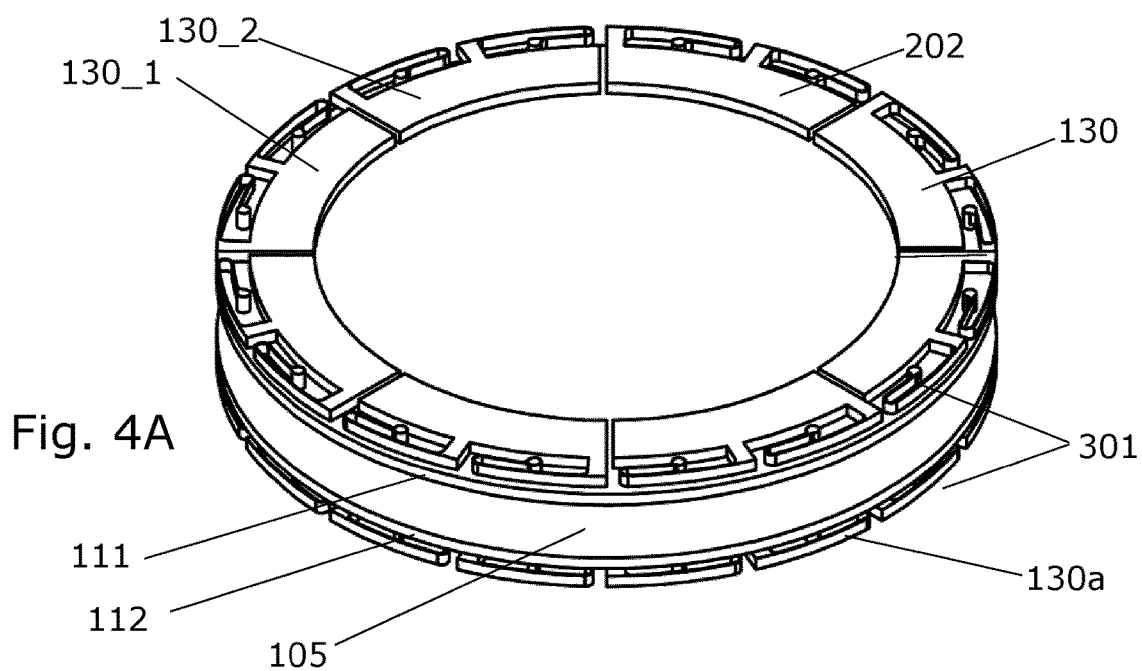
FIGS. 4A-4D shows a second example of an elastic element.
Figure 4B:
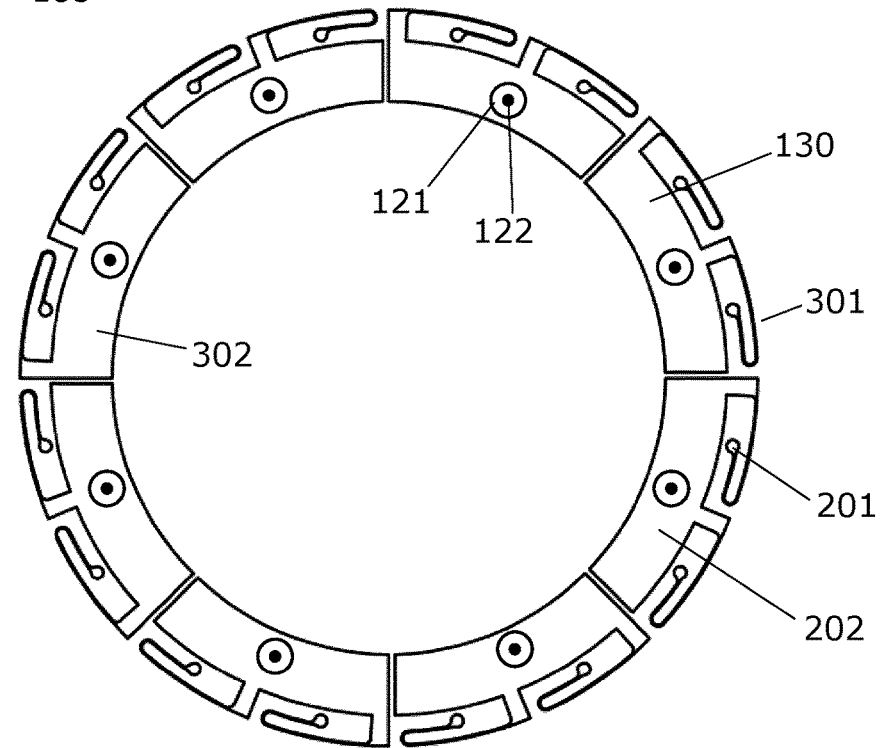
Figure 4C:
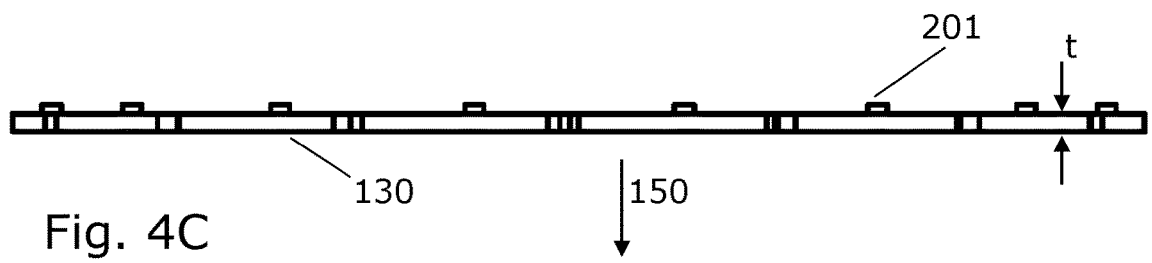
Figure 4D:
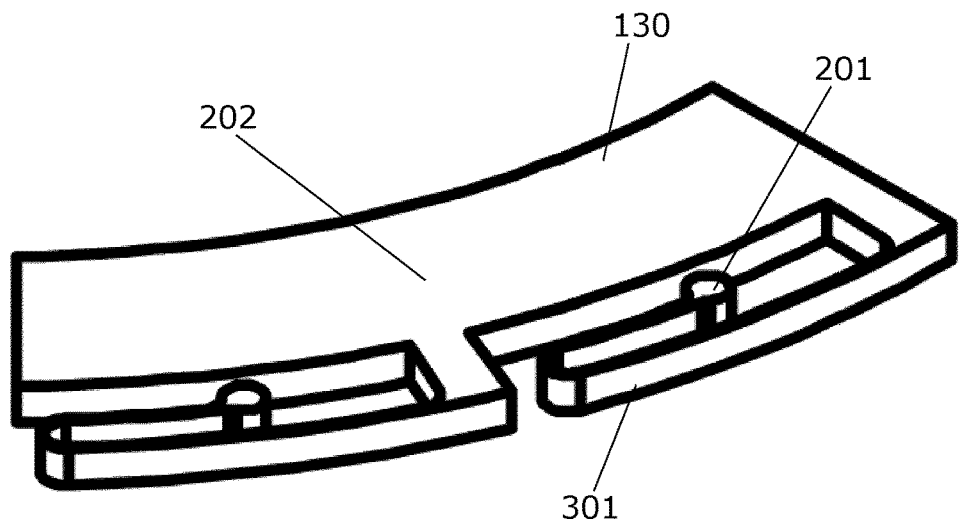

As shown in FIGS. 4B and 4D, the spring elements 301 are formed as U-shaped elements. An end-portion of the spring elements 301 comprises the first portion 201.

The U-shaped design of the spring elements 301 allows radial movement as well as y-axis tilt (cf. FIG. 2) of the contact point, i.e. the first portion 201. The cross section thickness of spring element 301 may vary from the first portion 201 to the second portion 202 to achieve desired properties of the first and second spring constants k1, k2. Due to the thickness t (FIG. 4C) of the spring element 301 in the direction of the optical axis 150, the spring constant k2 in the direction of the optical axis can be made greater than the spring constant k1 in the radial direction. Also, the torsional spring constant around the y-axis (cf. FIG. 2) can be made sufficiently low relative to the second spring constant k2.

The non-symmetrical design and off-centre location of the first portion 201 where the cover member 111,112 is supported facilitates the y-axis tilt. That is, when the first portion 201 experiences a pressure, the non-symmetrical design supports tilting due to bending of the cover member 111, 112.

FIG. 4C shows that the elastic element 130 is formed as a flat structure, with the end-portion comprising the first portion 201 protruding out so that the first portions 201 are distanced from other portions of the elastic element 130 in the direction of the optical axis 150. Due to the protruding first portions 201, the first and/or second cover members 111, 112 can be connected to the first portions 201 while a clearance between the cover member and the elastic element 130 is provided by the protruding first portions.

Particularly, the clearance provided by the protruding portions of the springs 301, such as the protruding first portions 201, allows the cover members 111, 112, to bend while still ensuring clearance between the cover member and the inner periphery of the support member 302 where the lowest clearance occurs at maximal being of the cover member.

Also in this example, the spring elements 301 are structured as individual spring elements.

In this example, a plurality of elastic elements 130_1, 130_2 are arranged so that the inner periphery of the plurality of elastic elements 130_1, 130_2 forms a hole constituting an aperture for the lens 100.

Each elastic element 130 comprises two springs 301 in this example, although each elastic element 130 may have one or more springs 301, and e.g. configured so that a single elastic element 130 forms a hole constituting the aperture of the lens 100 as in FIGS. 3A-3C.

Similarly, to FIGS. 3A-3C, each elastic element 130 comprises a support member 302. The actuator displacement elements 122 are connected to support members 302 via the second portions 202 of the elastic element 130.

Thus, in this example each of the support members 302 are configured as a common support for a plurality of the spring elements 301 or elastic portions of the elastic element 130. As shown, displacement elements 122 are connected one-to-one with the support members 302, but each of the support members 302 could alternatively be configured as a common support for a plurality of displacement elements.

The support member 130 in FIGS. 4A-4D and other designs may be monolithically formed, e.g. as a MEMS structure, by injection molding, by 3D printing or by other methods.

The portion of the elastic element 130 which constitute the support member 302 is located radially closer to the optical axis 150 than the spring elements 301.

The elastic element 130 in FIGS. 3A-3C and 4A-4D may be configured so that the elastic element 130 in addition to the one or more spring elements 301 also comprises an elastic material, such as an elastic adhesive, connected to the first and/or second portion 201, 202 so that the first portion 201 is fixed to the actuator displacement element 122 via the adhesive, and/or so that the second portion 202 is fixed to the first or second cover member 111, 112. The combination of spring elements 301 and elastic material, such as adhesive, provided for connecting the first and/or second portions 201, 202 with the displacement element 122 and the cover member 111, 112, respectively, may advantageously improve the capability of the elastic element 130 to deform in response to the bending of the cover member 111, 112 so that generation of stresses in the cover member is reduced.

Figure 6A:
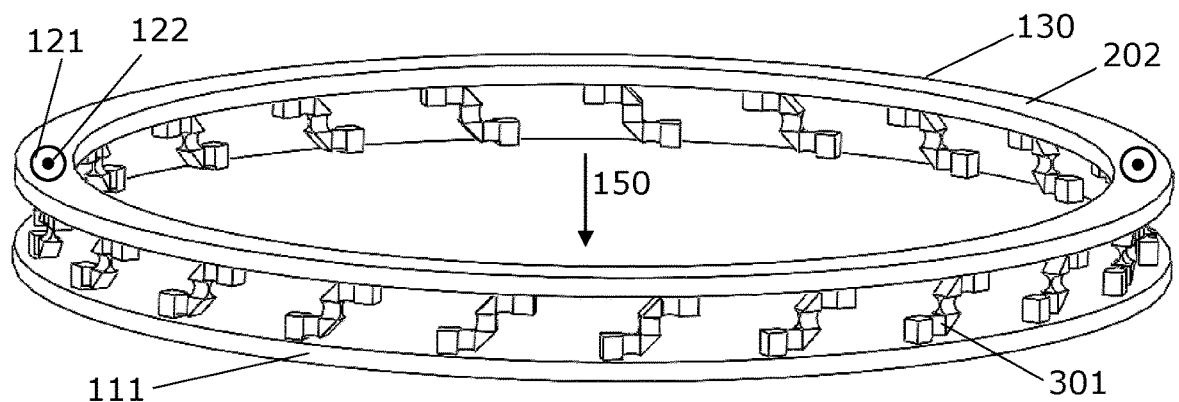
FIGS. 6A-6C shows a third example of an elastic element based on elastic hinge structures.
Figure 6B:
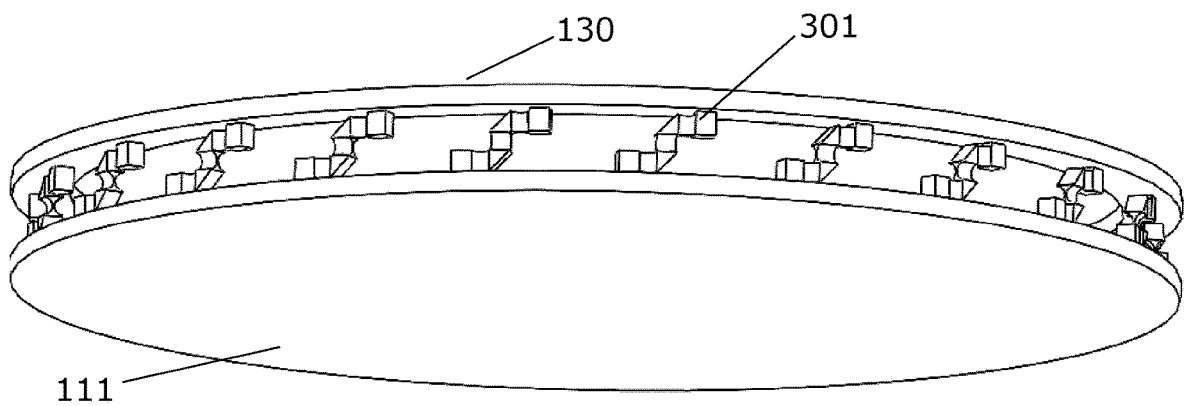
Figure 6C:
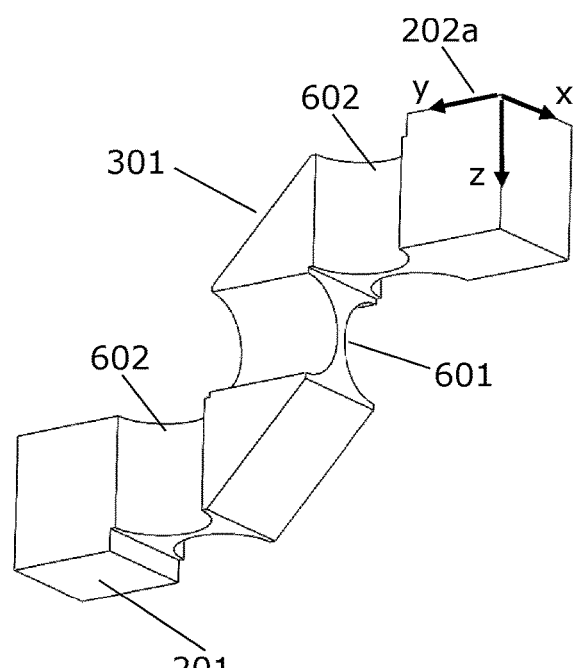

FIGS. 6A-6C show an alternative configuration of the elastic element 130. FIG. 6A shows that the elastic element 130 comprises a ring shaped structure which comprises the a second portion 202. FIGS. 6A-6B only principally illustrates that the actuator displacement elements 122 are fixed to the second portion. The elastic element comprises a plurality of spring elements 301 which are configured as hinge structures. The spring elements are fixed to the first cover member 111 via their first portions 101.

FIG. 6C shows a possible configuration of the hinge structures 601, 602 which are formed by creating a thin thickness along a direction defining the hinge axis. The illustrated xyz coordinate system is defined relative to the surface 202a which is fixed to the second portion 202, here via the ring structure.

According, the spring element 301 comprises a first hinge structure 601 defining a rotation axis which enables rotation about the y-axis, or about an axis which is tangent to the path 151 circumscribing the optical axis 150. The first hinge structure 601 therefore supports relative rotation about the y-axis between the between the first transparent cover member 111 and the actuator displacement elements 122. In other words, the first hinge structure is arranged to deform elastically in response to the torque Ty around the y-axis generate by a relative displacement between the first transparent cover member and the actuator displacement elements.

The spring element 301 further comprises a second hinge structure 602 defining a rotation axis which enables rotation about the z-axis and thereby supports. Due to the extension of the spring element 301 along the y-axis, the z-axis rotation, the second hinge structure 602 generates radial motion and, therefore, supports the relative radial displacement between the first transparent cover member 111 and the actuator displacement elements 122.

The rotational stiffness of the first and second hinge structures 601, 602 depends on the material stiffness and therefore be designed as needed, but obviously with a lover limit. Similarly, the hinge structure can be designed with a high stiffness in the z-axis direction by designing the first and second hinge structures 601, 602 with a sufficiently high length along the hinge axes.

Advantageously, the y-axis and z-axis rotations provided by the first and second hinge structures 601, 602 provides decoupled rotations.

Figure 7:
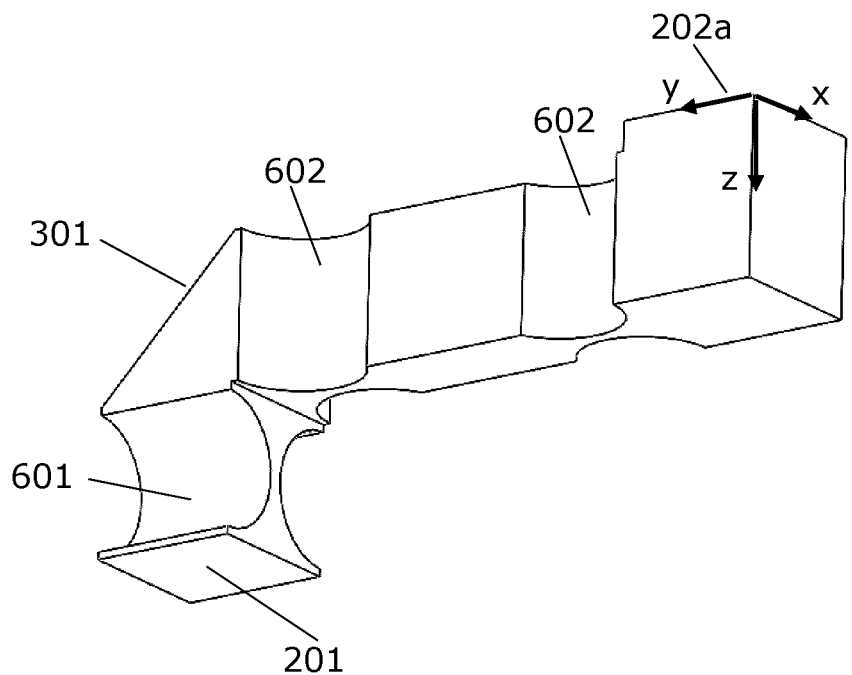
FIG. 7 shows a further example of an spring element.

FIG. 7 shows an alternative spring structure 301 with first and second hinge structures 601, 602, equivalent to FIG. 6C, but in a configuration that enables a lower height along the z-axis. The two second hinge structures 602 in FIG. 7 and FIG. 6C allows the first portion 201 of the spring element 301 to displace radially, i.e. in the x direction, without rotation about the z-axis.

Figure 8:
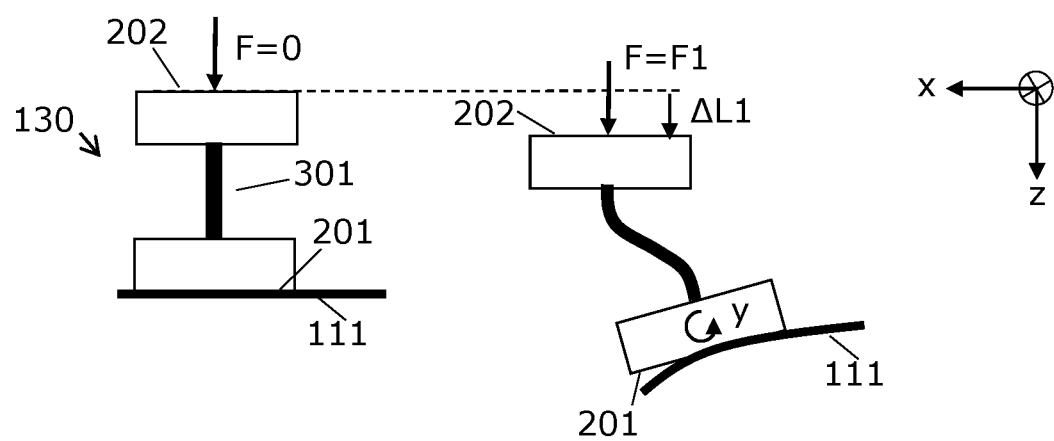
FIG. 8 illustrates the principal requirements of the elastic element.

FIG. 8 summarizes the requirements to the elastic element 130. Thus, the illustration to the left illustrates the elastic element 130, or a part of the elastic element, comprising the spring element 301, in a state where the actuator 121 does not generate a force, i.e. F=0. Thus, the first cover member 111 is in a state where its curvature is not changed by the actuators.

In the illustration to the right, the actuator displacement element has been activated to cause a z-axis displacement of ΔL1. The z-axis displacement generates a non-zero equilibrium force F1 (i.e. in the stationary bending state of the cover member) in the z-direction due to the reaction forces caused at least in part by the bending of first cover member 111. The z-axis displacement generated by the actuator 121 causes the first cover member 111 to bend as exaggeratedly shown. The bending causes, besides the ΔL1 z-axis displacement, a radial displacement of the first portion 201 along the x-axis and a rotation of the first portion 201 about the y-axis. The different examples of the elastic elements 130 described herein provides the same response to the displacement of the actuator displacement element 122, namely radial displacement and a rotation to support the bending of the first or second cover member 111.

Figure 5:
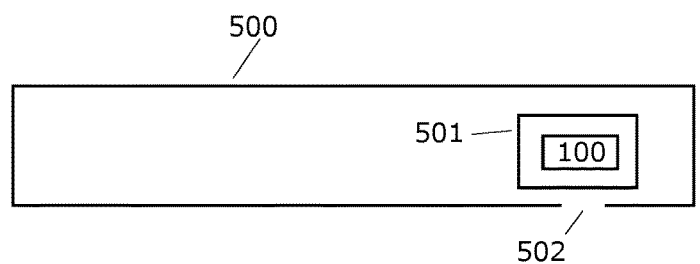
FIG. 5 shows an electronic device comprising the variable lens.

FIG. 5 shows a cross-sectional view of electronic device 500 such as a smartphone, a tablet or a part of a laptop or other device. The device 500 may comprise a camera module 501 arranged for imaging light onto an image sensor received via an aperture 502. The controllable lens 100 forms part of a camera module 501 and optionally other lenses and the image sensor. Examples of the electronic device 500 comprises portable computers, smartphones, watches, tablets, cameras, spectacles with variable lenses, measurement devices arranged for scanning distances, image projectors arranged for creating an image by scanning light beams. Accordingly, the lens 100 may be used for various purposes such as imaging, light and image projecting, light beam scanning, light detection Lidar scanning and others.

The invention claimed is:

1. A controllable lens with variable optical power, the lens comprising:
   a first cover member and a second cover member, wherein one of the first and second cover members is transparent, and the other of the first and second cover members is transparent or reflective,
   a transparent, deformable, non-fluid body sandwiched between the first and second cover members, so that the first and second cover members and non-fluid body constitute a lens with an optical axis intersecting the first and second cover members and the non-fluid body,
   one or more actuators comprising a plurality of actuator displacement elements configured to be displaced in a direction parallel with the optical axis,
   one or more elastic elements connecting the actuator displacement elements with the first cover member, wherein at least a portion of each of the one or more elastic elements is configured to deform elastically in response to a relative radial displacement between the first cover member and the actuator displacement elements,
   wherein each of the one or more elastic elements has a first stiffness in the radial direction and a second stiffness in the direction of the optical axis, wherein the first stiffness is smaller than the second stiffness and the first stiffness is configured to enable radial deformations in the range from 0.05 μm to 500 μm, and wherein the controllable lens is configured so that in response to a displacement of the actuator displacement elements in the direction parallel with the optical axis and the generated bending of the first cover member a surface at an interface between the one or more elastic elements and the first cover member is rotated about an axis, which is tangent to a path encircling the optical axis.

2. The controllable lens according to claim 1, wherein each of the one or more elastic elements are configured to deform elastically in response to a torque (Ty) around an axis being tangent to the path circumscribing the optical axis, wherein the torque is generated by the relative radial displacement between the first cover member and the actuator displacement elements.

3. The controllable lens according to claim 1, wherein each of the one or more elastic elements has at least one first portion fixed to the first cover member and a second portion fixed to at least one of the actuator displacement elements, wherein the first and second portions are elastically connected.

4. The controllable lens according to claim 3, wherein the controllable lens comprises a plurality of the first portions of the one or more elastic elements, wherein the first portions are connected to the first cover member at separated locations thereof distributed along a path circumscribing the optical axis.

5. The controllable lens according to claim 3, wherein each of the one or more elastic elements comprises one or more spring elements, wherein each spring element comprises the first portion.

6. The controllable lens according to claim 5, wherein each of the spring elements are structured as individual spring elements.

7. The controllable lens according to claim 5, wherein each of the spring elements are structured as individual spring elements and wherein each of the one or more elastic elements comprises a support member configured to be a common support for a plurality of the displacement elements or for a plurality of the elastic portions of each of the one or more elastic elements, wherein the support member comprises the second portion.

8. The controllable lens according to claim 5, wherein each of the spring elements are structured as individual spring elements and, wherein each of the one or more elastic elements comprises a support member configured to be a common support for a plurality of the displacement elements or for a plurality of the elastic portions of each of the one or more elastic elements, wherein the support member comprises the second and wherein each of the one or more support members are located radially closer to the optical axis than the spring elements.

9. The controllable lens according to claim 3, wherein each of the one or more elastic elements comprises one or more spring elements, and an elastic material connected to the first or second portion.

10. The controllable lens according to claim 1, wherein each of the one or more elastic elements has a first spring constant (k1) in the radial direction and a second spring constant (k2) in the direction of the optical axis, wherein the first spring constant (k1) is smaller than the second spring constant (k2).

11. The controllable lens according to claim 1, wherein the actuators are fixed to a stationary support so that the displacement elements are configured to displace relative to the stationary support.

12. The controllable lens according to claim 1, wherein the controllable lens comprises one or more second elastic elements connecting the actuator displacement elements with the second cover member.

13. The controllable lens according to claim 1, wherein each of the one or more elastic elements comprises an elastic adhesive.

14. The controllable lens according to claim 1, wherein the controllable lens comprises a first elastic element connecting the actuator displacement elements with the first cover member, and a second elastic element connecting other actuator displacement elements, comprised by the controllable lens, with the second cover member.

15. An electronic device comprising a controllable lens according to claim 1.

* * * * *